(12) United States Patent
Chi et al.

(10) Patent No.: US 8,010,532 B2
(45) Date of Patent: Aug. 30, 2011

(54) SYSTEM AND METHOD FOR AUTOMATICALLY ORGANIZING BOOKMARKS THROUGH THE USE OF TAG DATA

(75) Inventors: Liang-Yu Chi, San Francisco, CA (US); Dmitry Yurievich Pavlov, San Jose, CA (US); Yun Fu, Sunnyvale, CA (US); Eren Manavoglu, Menlo Park, CA (US); Paul Heymann, Menlo Park, CA (US); Zhichen Xu, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 209 days.

(21) Appl. No.: 11/624,072

(22) Filed: Jan. 17, 2007

(65) Prior Publication Data

US 2008/0172399 A1 Jul. 17, 2008

(51) Int. Cl.
*G06F 17/30* (2006.01)
*G06F 7/00* (2006.01)

(52) U.S. Cl. ......... 707/737; 707/769; 707/812; 707/828

(58) Field of Classification Search .................... None
See application file for complete search history.

(56) References Cited

U.S. PATENT DOCUMENTS

| | | | |
|---|---|---|---|
| 6,032,162 A * | 2/2000 | Burke | 715/207 |
| 6,321,228 B1 * | 11/2001 | Crandall et al. | 707/10 |
| 6,360,227 B1 * | 3/2002 | Aggarwal et al. | 707/102 |
| 6,546,393 B1 * | 4/2003 | Khan | 1/1 |
| 6,598,054 B2 * | 7/2003 | Schuetze et al. | 707/103 R |
| 6,832,350 B1 * | 12/2004 | Bates et al. | 715/206 |
| 7,085,997 B1 * | 8/2006 | Wu et al. | 715/201 |
| 7,146,359 B2 * | 12/2006 | Castellanos | 1/1 |
| 7,747,937 B2 * | 6/2010 | Rojer | 715/206 |
| 2006/0047655 A1 * | 3/2006 | Peter | 707/6 |
| 2007/0043745 A1 * | 2/2007 | Rojer | 707/100 |
| 2007/0185858 A1 * | 8/2007 | Lu et al. | 707/5 |
| 2008/0059478 A1 * | 3/2008 | Craine | 707/10 |
| 2008/0086496 A1 * | 4/2008 | Kumar et al. | 707/102 |
| 2008/0091524 A1 * | 4/2008 | Yan et al. | 705/14 |

OTHER PUBLICATIONS

Yoelle S. Maarek; Israel Z. Ben Shaul, "Automatically Organizing Bookmarks Per Contents", Fifth International World Wide Web Conference, May 6-10, 1996, Paris, Paris France, pp. 1-17.*

* cited by examiner

*Primary Examiner* — Greta L Robinson
*Assistant Examiner* — James J Wilcox
(74) *Attorney, Agent, or Firm* — Seth H. Ostrow; Ostrow Kaufman LLP

(57) ABSTRACT

The present invention is directed towards systems and method for organization of bookmarks. The method according to one embodiment comprises retrieving one or more bookmarks associated with one or more content items, a given bookmark generated by a user of a client device and identifying one or more tags associated with one or uniform resource locators corresponding to the or more bookmarks. A bookmark folder hierarchy is created through use of a clustering algorithm on the basis of the one or more tags associated with the one or more uniform resource locators corresponding to the one or more bookmarks.

10 Claims, 5 Drawing Sheets

SYSTEM AND METHOD FOR AUTOMATICALLY ORGANIZING BOOKMARKS THROUGH THE USE OF TAG DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED REFERENCES

The present application is related to the following commonly owned U.S. patents and patent applications:

U.S. patent application Ser. No. 11/295,166, now U.S. Pat. No. 7,707,201 B2, entitled "SYSTEMS AND METHODS FOR MANAGING AND USING MULTIPLE CONCEPT NETWORKS FOR ASSISTED SEARCH PROCESSING," filed on Dec. 5, 2005;

U.S. patent application Ser. No. 10/797,586, now U.S. Pat. No. 7,340,460 B1, entitled "VECTOR ANALYSIS OF HISTOGRAMS FOR UNITS OF A CONCEPT NETWORK IN SEARCH QUERY PROCESSING," filed on Mar. 9, 2004;

U.S. patent application Ser. No. 10/797,614, now U.S. Pat. No. 7,346,629 B2, entitled "SYSTEMS AND METHODS FOR SEARCH PROCESSING USING SUPERUNITS," filed on Mar. 9, 2004; and U.S. Pat. No. 7,051,023, entitled "SYSTEMS AND METHODS FOR GENERATING CONCEPT UNITS FROM SEARCH QUERIES," filed on Nov. 12, 2003;

The disclosures of which are hereby incorporated by reference herein in their entirety.

FIELD OF THE INVENTION

The invention disclosed herein relates generally to the organization of bookmarks. More specifically, the present invention relates to the automatic organization of bookmarks associated with one or more content items through the use of tag data associated with the one or more content items.

BACKGROUND OF THE INVENTION

The Internet provides access to an ever increasing quantity of web sites, which may contain a wide variety of content items. Client devices, communicatively coupled to the Internet, are able to access various websites which may contain images, video, audio clips, documents, etc. Access to websites is typically made available through use of a browser installed on a client device of a given user. The given user specifies a uniform resource locator ("URL") of a content item, e.g., a website or webpage, which the given user wishes to access.

Many users of client devices who access the Internet often view hundreds or thousands of web sites or web pages during a given time period, such as a single month. Often, users may wish to revisit a given website or webpage that contains content the user wishes to view, listen to, etc., at a later date. For example, a user may perform research on a given topic and identify a website or a webpage that contains information that the user wishes to further review. Through use of an Internet browser bookmark, the user may store a pointer or link to the website or webpage, allowing the user to directly access the website or webpage at a later date without having to search or spend time locating the URL associated with the website or webpage. A bookmark to a website or webpage may be stored by the Internet browser with which the bookmark was generated. Thereafter, a user of a client device may review the bookmarks stored by a given Internet browser and select a given bookmark, causing the browser to directly access the website or webpage associated with the selected bookmark.

Similarly, bookmarks for a given user to one or more content items may be stored by an bookmark storage provider, such as Yahoo!. For example, the Yahoo! MyWeb® service allows users to store bookmarks to content items in a central network accessible location, allowing users to access the bookmarks from any client device coupled to the Internet. Services, such as Yahoo! MyWeb®, may also permit users to access various bookmarks generated and stored by their friends, family members, buddies, or other members of one or more social networks to which a given user belongs.

The bookmarks generated by a given user are often associated with a wide variety of content items. For example, a given user of a client device may access a news webpage containing an article of interest to the user. Similarly, the user may access a webpage containing a video clip of a movie the user wishes to view. Additionally, the user may access a webpage containing an image file or an audio file of particular song. The user may generate a bookmark for each of the content items in order to gain direct access to the content items at a late date.

The bookmarks that a given user generates may be associated with one or more keywords describing a given bookmarked content item, which may be referred to as tags. For example, a bookmark generated for a news article associated with computers may be stored with the tags "computer," "technology," "news," "article." Similarly, a bookmark generated for a movie video clip may be stored in conjunction with the tags "video," "funny," "favorite clips," whereas a bookmark generated for an audio clip may be stored with the tags "rock," "music," "Phish," "awesome."

The plurality of bookmarks generated by users of client devices are typically stored in a simple structure, such as a flat file or folder on a storage device, and presented to a user of a client device in a list format with the description or tag that corresponds to the bookmark. While tags and folders associated with the plurality of bookmarks provide a means of accessing bookmarks that are described by the tag or contained in the folder, many users have not diligently applied either organizational approach to the vast majority of their bookmarks. As a consequence, while the purpose of a bookmark is to provide a user with direct access to a given content item, often locating a given bookmark among hundreds or thousands of bookmarks in a list is more time consuming and difficult than performing a new search via a search engine to locate the desired content item.

Current methods and systems for generating, storing, and presenting bookmarks a given user of client device thus fail to provide users with an organized structure for reviewing and accessing bookmarks. In order to overcome shortcomings associated with existing techniques for storing and accessing bookmarks, embodiments of the present invention provide systems and methods for utilizing tag data associated with addresses (e.g., URLs) corresponding to bookmarks, thereby allowing the storage and presentation of bookmarks to users in an organized structure, facilitating efficient and direct access to bookmarked content items.

SUMMARY OF THE INVENTION

The present invention is directed towards systems and methods for organizing bookmarks to content items. According to one embodiment, the present invention is directed towards a method for generating a bookmark folder hierarchy for storage and presentation of one or more bookmarks to content items. The method according to this embodiment comprises retrieving one or more bookmarks associated with one or more content items, a given bookmark generated by a user of a client device, and identifying one or more tags associated with one or uniform resource locators corresponding to the or more bookmarks. A bookmark folder hierarchy is generated through use of a clustering algorithm on the basis of the one or more tags associated with the one or more uniform resource locators corresponding to the one or more bookmarks.

The method may comprise identifying a given folder from the bookmark folder hierarchy to which the one or more bookmarks belong on the basis of the one or more tags associated with the one or more bookmarks. Retrieving one or more bookmarks may comprise retrieving one or more bookmarks stored on a client device associated with the user. Retrieving may also comprise retrieving one or more bookmarks maintained by a bookmark storage provider. According to certain embodiments, identifying one or more tags comprises identifying one or more tags generated by the user of the client device. Identifying one or more tags may also comprise identifying one or more global tags generated by one or more users. The method may account for tags from any number of users, over a geographically diverse locations, which may be observed in the aggregate to determine classification strength.

A bookmark folder hierarchy may be generated through use of a clustering algorithm. Embodiments of the present invention may utilize a number of different clustering algorithms that are know to those of skill in the art. Clustering algorithms may include, but are not limited to, a k-means clustering algorithm, k-median clustering algorithm, a two-step clustering algorithm, a Ward's minimum variance clustering algorithm, a single linkage clustering algorithm. The hierarchical structure that the cutering algorithm generates may be a hierarchal tree structure.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description of the preferred embodiments, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
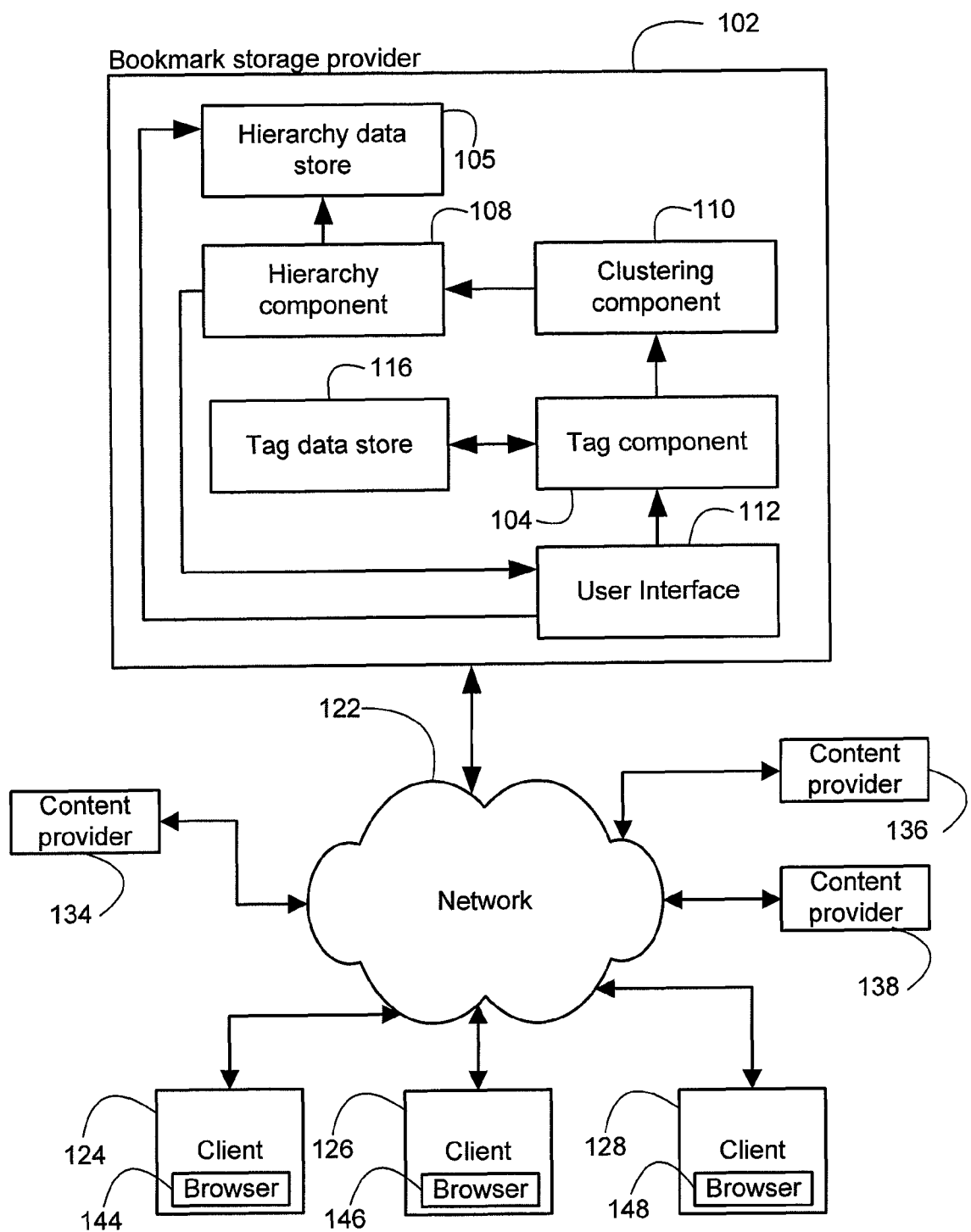
FIG. 1 is a block diagram presenting a system for generating a hierarchal structure for one or more bookmarks associated with one or more content items through use of tag data according to one embodiment of the present invention.

FIG. 1 presents a block diagram depicting one embodiment of a system for generating a hierarchal folder structure for storing and presenting bookmarks through use of tag data associated with the bookmarks. According to the embodiment illustrated in FIG. 1, client devices 124, 126, and 128 are communicatively coupled to a network 122, which may include a connection to one or more local and wide area networks, such as the Internet. According to one embodiment of the invention, a client device 124, 126 and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A user of a client device 124, 126, and 128 communicatively coupled to the network 122 may access a variety of content items at content providers 134, 136, and 138 available on the network 122 through use of a browser 142, 144, and 146 installed upon a given client device 124, 126, and 128. For example, a user of a client device 124, 126, and 128 may direct a browser 142, 144, and 146 installed upon the client device 124, 126, and 128 to access a given uniform resource locator ("URL") that identifies a location of a content item. The content item at the URL that the browser 142, 144, and 146 accesses may comprise content items including, but not limited to, a website, an audio file, a video file, an image, a web page, document, etc.

The URL at which the content item is available may be bookmarked by the user of the client device 124, 126, and 128. According to one embodiment of the invention, a bookmark comprises a reference to a given URL that is saved by a browser 144, 146, and 148 on a client device 124, 126, and 128 in response to a user request to generate the bookmark. Alternatively, the bookmark may comprise a reference to a given URL that is saved by a bookmark storage provider 102, such as the Yahoo! MyWeb® service. The one or more bookmarks may saved in conjunction with a title or name, which may be specified by the user of the client device 124, 126, and 128 with which the request to generate the bookmark originated. For example, a user of a client device 124, 126, and 128 may frequently visit the website available at www.yahoo.com. The user may wish to generate a bookmark to the website and may specify one or more tags for the bookmark, such as "search engine," or "search." A user of the client device 124, 126, and 128 may select a given bookmark through use of a selection device, such as a mouse or a keyboard, directing a browser on the client device 124, 126, and 128 to access the content at the URL associated with the selected bookmark.

A user of a client device 124, 126, and 128 may also choose to generate one or more tags for a content item available at a given URL. For example, a content item available at a given URL may be displayed in conjunction with a "save" or "bookmark this!" button, providing the user of the client device 124, 126, and 128 with the capability (in the save interface) to generate one or more tags for the content item at the URL. Similarly, a user of a client device 124, 126, and 128 may choose to utilize a bookmark storage provide 102, such as the Yahoo! MyWeb® service, providing the user with the ability 124, 126, and 128 to generate one or more tags for content available at a given URL.

According to one embodiment of the invention, a tag associated with a content item available at a given URL comprises one or more terms that a user of a client device 124, 126, and 128 associates with the content item. For example, a content item available at a given URL may comprise an image of a sunset. A user of a client device may generate a tag for the image comprising the terms "picture" or "sunset." Similarly, a content item available at another given URL may comprise a Rolling Stones song, for which a user may generate a tag comprising the terms "rock n roll" or "Stones."

The one or more tags generated by a user of a client device 124, 126, and 128 for a content item available at a given URL may be delivered to a tag data store 116 at a bookmark storage provider 102. The tag data store 116 may comprise an accessible memory structure such as a database or digital storage library, capable of providing for the retrieval and storage of one or more tags associated with content available at one or more URLs. According to one embodiment of the invention, the tag data store 116 is operative to maintain tags and bookmarks on a per user basis. For example, the tag data store 116 may maintain an index identifying a user and the one or more tags generated by the user for content items available at one or more URLs. According to another embodiment of the invention, or in conjunction with the foregoing, the tag data store 116 is operative to maintain tags and bookmarks according to the URL of the content item with which one or more tags are associated. For example, one or more users of client devices 124, 126, and 128 may generate tags for a given URL, such as www.ebay.com. The tag data store 116 may maintain an index identifying the one or more tags generated by one or more users for the URL www.ebay.com, which may also be on a per user basis.

As previously described, the one or more bookmarks generated by a user of a client device 124, 126, and 128 may be stored by a browser 144, 146, and 148 on a client device 124, 126, and 128 of a given user, or at the bookmark storage provider 102. The browser 144, 146, and 148 with which one or more bookmarks are generated and stored, however, may be limited to storing bookmarks in a single folder or file, requiring a user of a client device 124, 126, and 128 upon which the one or more bookmarks are stored to traverse an unorganized list or folder to locate a desired bookmark. Accordingly, a user of a client device 124, 126, and 128 may elect to utilize the bookmark storage provider 102 to generate a hierarchal folder structure for the one or more bookmarks stored on a client device 124, 126, and 128 or at the bookmark storage provider 102.

Through use of an interface 112 at the content provider 102, a user of a client device 124, 126, and 128 may transmit a request to the content provider 102 to generate a hierarchal folder structure for the one or more bookmarks stored on the user's client device. According to the embodiment illustrated in FIG. 1, a tag component 104 at the content provider 102 is operative to retrieve the one or more bookmarks stored on a client device 124, 126, and 128 of a given user. For example, the tag component 104 may be operative to retrieve the one or more files or folders in which one or more bookmarks are stored on a client device 124, 126, and 128 of a given user or that the bookmark storage provider 102 maintains.

The tag component 104 identifies the one or more URLs associated with the one or more retrieved bookmarks, as well as the user generated title or name associated with the one or more retrieved bookmarks. The tag component 104 thereafter identifies the one or more tags associated with the one or more identified URLs through use of the data maintained in the tag data store 116. As previously described, the tag data store 116 may maintain tag data generated by one or more users of client devices 124, 126, and 128 for one or more URLs at which content is available ("public tag data"). The tag component is operative to retrieve the one or more tags associated with the one or more URLs corresponding to the one or more retrieved bookmarks.

The tag component delivers the one or more bookmarks and the tag data associated with the one or more URLs corresponding to the one or more bookmarks to a clustering component 110. According to one embodiment of the invention, the clustering component 104 is operative to utilize a clustering algorithm to perform an analysis of the tag data associated with the one or more URLs to generate a hierarchal folder structure for the one or bookmarks. Alternatively, or in conjunction with the foregoing, the clustering component 104 may utilize a clustering algorithm to perform an analysis of the tag data associated with the one or more URLs as well as the user generated titles or names associated with the one or more bookmarks to generate a hierarchal folder structure for the one or more bookmarks. According to various embodiments, the system may implement the clustering algorithm using a k-means algorithm, a k-median algorithm, a two-step algorithm, a Ward's minimum variance algorithm, a single linkage algorithm, etc.

According to one embodiment of the present invention, the one or more folders generated by the clustering component 110 may be associated with or based on one or more tags. For example, the clustering component 110 may generate a folder associated with the tag "web," a folder associated with the tag "video," and a folder associated with the tag "audio." The tags associated with the one or more folders generated by the clustering component 110 may be used to identify the one or more folders to which the one or more bookmarks belong.

The one or more bookmarks and the hierarchal folder structure generated by the clustering component 110 are delivered to a hierarchy component 108. The hierarchy component 108 is operative to identify the folders to which the one or more bookmarks belong based upon the tag data associated with the one or more folders and the one or more bookmarks. The hierarchy component 108 may further utilize the user generated titles or names associated with the one or more bookmarks to identify the one or more folders to which the one or more bookmarks belong.

The hierarchy component 108 may deliver the hierarchal folder structure to the user interface 112. The user of the client device 124, 126, and 128 with which the request for a hierarchal folder structure originated may review the structure generated by the bookmark storage provider 102. According to one embodiment of the invention, a user of a client device 124, 126, and 128 may modify the hierarchal folder structure generated by the content provider 102. For example, a user of a client device 124, 126, and 128 may elect to remove or add a folder to the hierarchal folder structure, or modify the folder to which a given bookmark belongs.

The user of the client device 124, 126, and 128 with which the request for a hierarchal folder structure originated may thereafter save the hierarchal folder structure to the user's client device 124, 126, and 128 or to a data store at the bookmark storage provider. The user of the client device 124, 126, and 128 may utilize the hierarchal folder structure to locate and select a desired bookmark and access a content item available at a given URL associated with the selected bookmark via the network 122.

Figure 2:
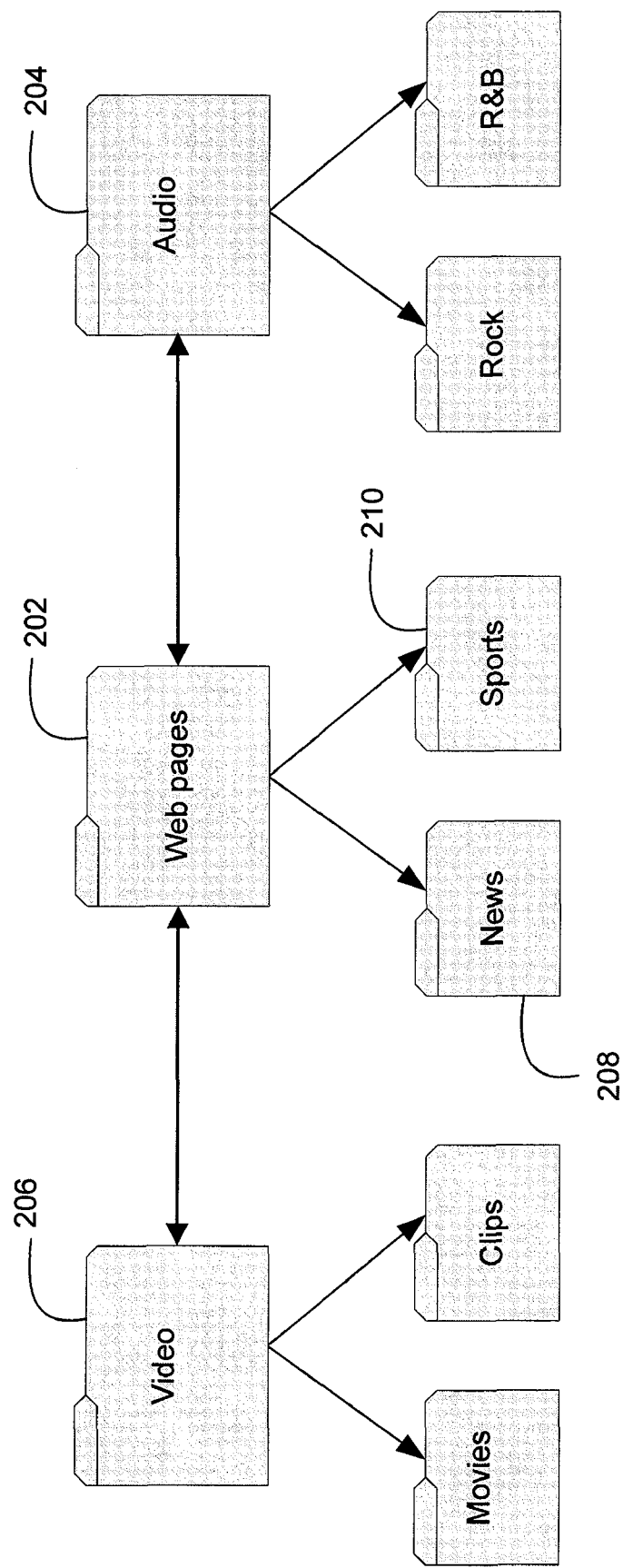
FIG. 2 is a block diagram illustrating an exemplary hierarchal folder structure generated through use of tag data associated with one or more bookmarks corresponding to one or more content items according to one embodiment of the present invention.

FIG. 2 is a block diagram illustrating an exemplary hierarchal folder structure generated through use of tag data for one or more bookmarks associated with one or more URLs at which content is available. In the hierarchal folder structure illustrated in FIG. 2, the folders at the top level of the hierarchy contain one or more bookmarks and one or more folders associated with a given content type. For example, the "Web pages" folder 202 contains one or more bookmarks associated with URLs at which web page content items are available. Similarly, a "Video" folder 206 contains one or more bookmarks associated with URLs at which video content items are available and an "Audio" folder 204 contains one or more bookmarks associated with URLs at which audio content items are available.

The sub-folders within a given folder contain one or more bookmarks that are associated with both the one or more sub-folder tags, and the one or more tags associated with the one or more folders above the sub-folder. For example, the "Web pages" folder 202 contains the sub-folders "News" 208 and "Sports," 210 containing one or more bookmarks associated with URLs at which web page content associated with news and sports, respectively, is available. The bookmarks within the "News" folder are associated with both the sub-folder tag "News," 208 as well as the tag "Web pages" 202. Similarly, the bookmarks within the "Sports" folder are 210 associated with both the sub-folder tag "Sports" 210 as well as the tag "Web pages" 202.

A user of a client device may traverse the one or more folders of a hierarchal folder structure to locate a desired bookmark. Upon locating a desired bookmark, a user of a client device may select the bookmark using a selection device, such as a mouse or a keyboard, directing a browser installed upon the client device to access the content available at the URL associated with the selected bookmark.

Figure 3:
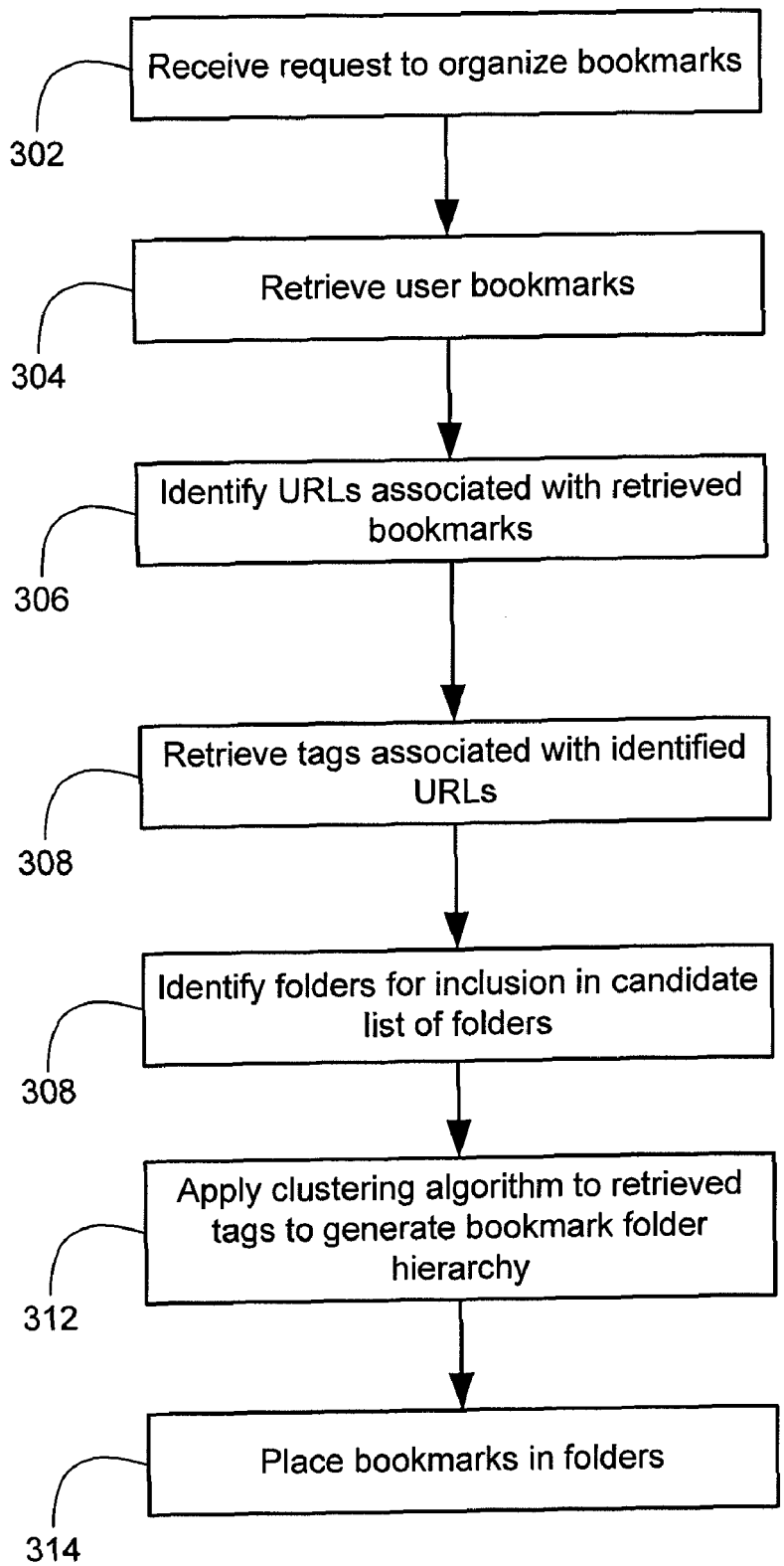
FIG. 3 is a flow diagram presenting a method for generating a hierarchal structure for one or more bookmarks associated with one or more content items according to one embodiment of the present invention.

FIG. 3 illustrates one embodiment of a method for generating a hierarchal folder structure for one or more bookmarks through use of bookmark tag data. According to the embodiment illustrated in FIG. 3, a request to organize one or more bookmarks is received, step 302. For example, a request may be received from a user of a client device upon which one or more bookmarks are stored or a user accessing a bookmark storage provider. Accordingly, a bookmark storage provider may receive the request to organize bookmarks from a client device.

The one or more bookmarks associated with the received request (e.g., bookmarks for a given user stored locally at a client device or at the bookmark storage provider) are retrieved or otherwise identified, step 304, and the URLs associated with the one or more bookmarks are identified, step 306. Alternatively, or in conjunction with the foregoing, the containing domains of the one or more bookmarks may be retrieved or otherwise identified. For example, where the bookmark storage provider locates bookmark that identifies the address "news.example.com," the bookmark storage provider may also identify the containing domain "example.com."

For the one or more URLs that the bookmark storage provider identifies, which may comprise containing domains for the one or more URLs, one or more tags are retrieved, step 308. According to one embodiment, the bookmark storage provider access one or more public tags that it maintains in a tag data store. Alternatively, or in conjunction with the foregoing, the bookmark storage provider may access one or more private tags that it maintains. One the basis of the one or more tags, a candidate list of folders for organization of the one or more bookmarks is identified, step 310. The bookmark storage provider may employ thresholds or other techniques to prune or otherwise limit the set of folders that the candidate list comprises. For example, the bookmark storage provider may eliminate those bookmarks with a small number of aggregate tags.

A clustering algorithm may be applied to the retrieved tags to generate a bookmark folder hierarchy, step 312. The bookmark storage provider may employ one or more clustering algorithms or techniques that are know to those of skill in the art, e.g., the clustering systems and methods incorporated by reference herein in their entirety, to select and organize the candidate list of folders in to a bookmark folder hierarchy. According to one embodiment, the bookmark folder hierarchy comprises a set of one or more folders that the bookmark storage provider selects from the candidate list, which may be through use of the clustering algorithm that a clustering component executers, which contain the greatest percentage of unfilled bookmarks. The one or more bookmarks associated with the request are placed into the folders, step 314. The bookmark storage provider may be operative to place the bookmarks into the folders to optimize the relevancy of the filing of the bookmarks and evenly distribute bookmarks across folders in the hierarchy. According to one embodiment, when attempting to organize N bookmarks, SQRT(N) produces a desired number of folders.

Figure 4:
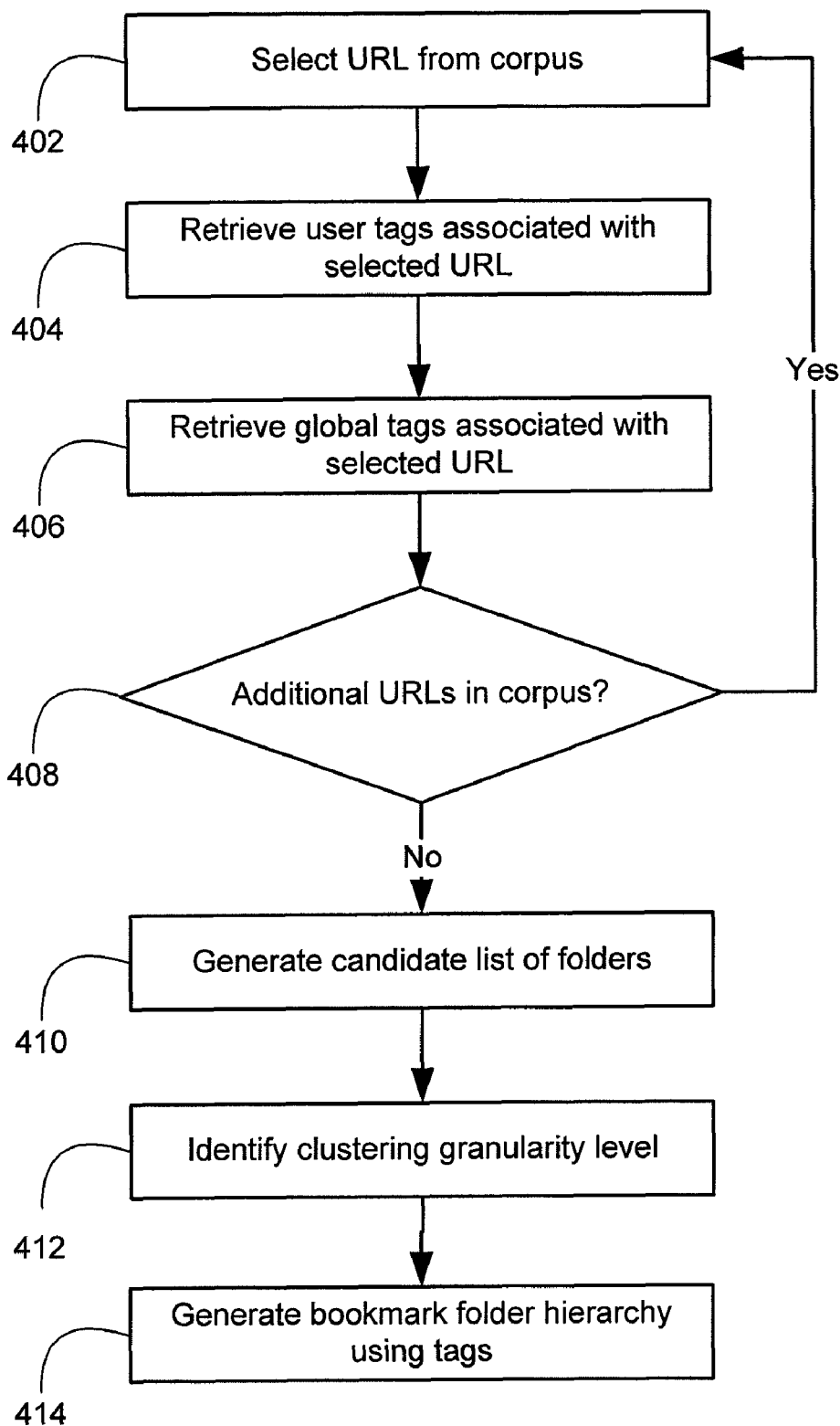
FIG. 4 is a flow diagram presenting a method for utilizing tag data associated with one or more bookmarks corresponding to one or more content items to generate a bookmark folder hierarchal structure according to one embodiment of the present invention.

As FIG. 3 illustrates, the bookmarks storage provider may use bookmark tags to organize one or more bookmarks in a bookmark folder hierarchy. FIG. 4 presents a flow diagram that illustrates one embodiment of a method for utilizing tags associated with one or more addresses to generate the bookmark folder hierarchy. The process begins with the selection of a URL from a corpus of bookmarks, step 402, e.g., a set of one or more bookmarks that the bookmark storage provider maintains. Additionally, the selecting may comprise the selection of one or more containing domains, collectively referred to in the present context as URLs.

The bookmark storage manager may retrieve or otherwise identify one or more tags that the user provides for the selected URL, step 404. According to one embodiment, the bookmark tag manager identifies public tags for the URLs that the user bookmarks. Alternatively, or in conjunction, private tags that the user generates may be identified. In addition to the foregoing, the bookmark storage provider may also retrieve global tags for a given URL selected from the corpus, step 408. The system performs a check to determine if additional URLs are present in the corpus for which the system may retrieve one or more tags, step 408. Where additional URLs are present in the corpus, processing continues with the selection of a subsequent URL from the corpus for processing, step 402. Where additional URLs are not present in the corpus for processing, step 408, the bookmark storage provider generates a candidate list comprising one or more folders, step 410. The candidate list may be pruned or otherwise reduced to eliminate statistically insignificant folders in the candidate list.

A clustering algorithm, such as the clustering systems and methods incorporated by reference herein in their entirety, clusters the folders in the candidate list to generate a bookmark folder hierarchy on the basis of tags associated with bookmarked URLs. A granularity level is set for the clustering algorithm, which may be set by an operator or system administrator of the bookmark storage provider, step 412. The granularity level controls the depth and breadth of the hierarchy, e.g., how many top level nodes below a root node, how many subfolders to instantiate, etc. The output of the clustering algorithm (which a clustering component may execute using the candidate list as an input) is used by the bookmark storage provider as bookmark folder hierarchy, step 414, for the organization of the one or more bookmarks.

Figure 5:
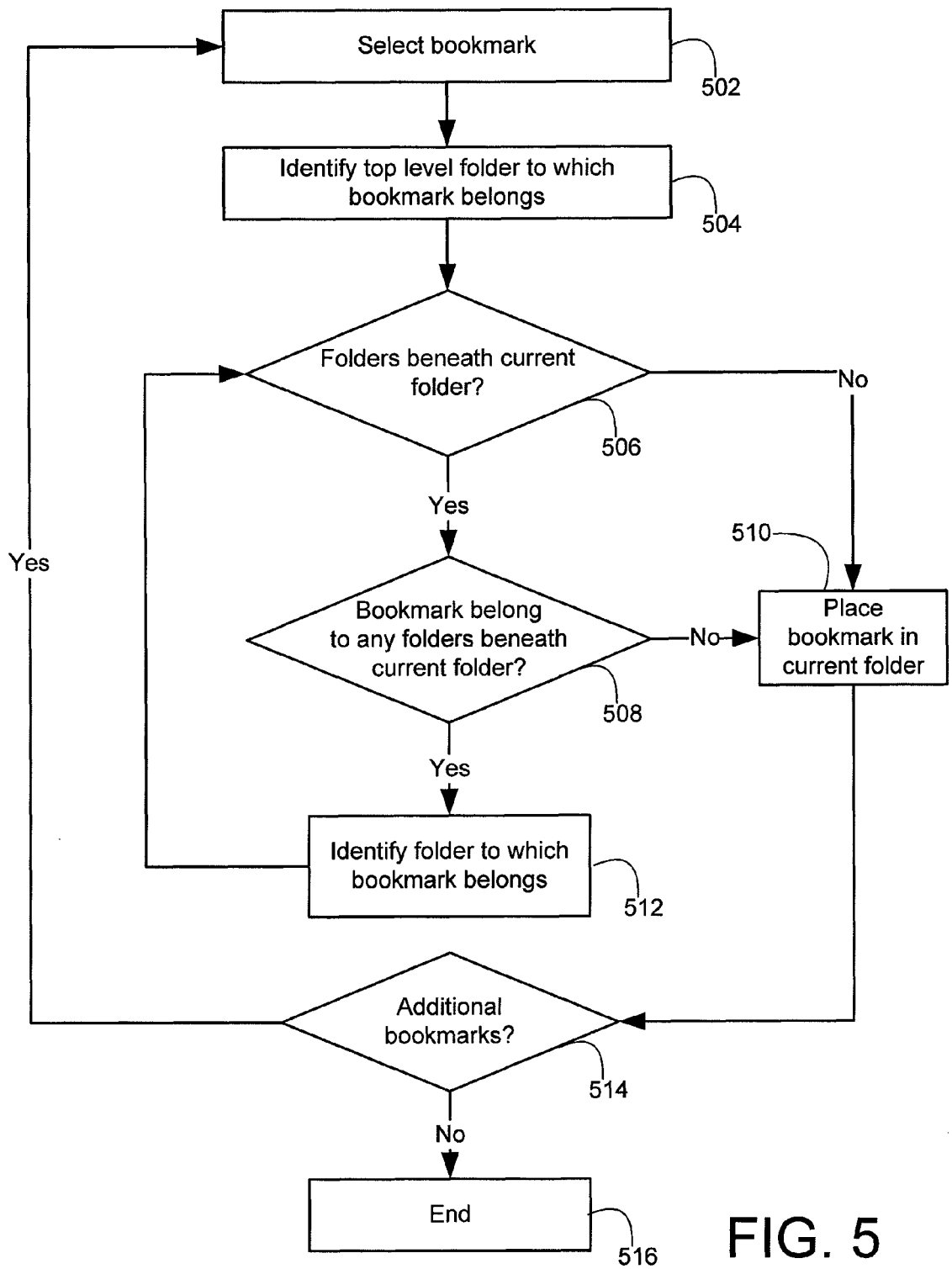
FIG. 5 is a flow diagram presenting a method for placing one or more bookmarks in a hierarchal structure through use of tag data associated with the bookmarks according to one embodiment of the present invention.

The bookmark storage provider may place one or more bookmarks into folders in the bookmark folder hierarchy as FIG. 3 illustrates. FIG. 5 presents one embodiment of a flow diagram illustrating one embodiment of a method for placing one or more bookmarks into the bookmark folder hierarchy, which may be made on the basis of one or more tags associated with a given bookmark. The process of FIG. 5 begins with the selection of a given bookmark from among one or more bookmarks for a given user, step 502. The bookmark storage provider identifies a top level folder in the bookmark folder hierarchy to which the given bookmark belongs, step 504. The identification of a top level folder to which the given bookmark belongs (which may be a node below a root node of the hierarchy) may be made on the basis of the one or more tags associated with the given bookmark.

A check is performed to determine if the current folder contains one or more sub-folders, step 506, e.g., the check determines if any folders exist in the hierarchy below the current folder. Where the check evaluates to false at step 506, another check is performed to determine if the given bookmark belongs to a folder beneath the current folder, step 508, which may be a sub-folder of the current folder. Where the checks at steps 506 and 508 evaluate to false, e.g., the system identifies the current folder as the proper folder for storage of the given bookmark, the given bookmark is placed in the current folder, step 510. Where the check at step 508 evaluates to false, the system identifies a sub-folder of the current folder, step 512. Alternatively, where the process traverses the hierarchy to a leaf folder and is unable to identify a proper folder for storage of the given bookmark, the system may explore up the hierarchy to identify folders that are part of other branches. The bookmark storage provider iterates that loop at steps 506, 508 and 512 until a proper folder for storage of the given bookmark is identified for storage of the given bookmark, step 510.

The given bookmark is placed in a folder in the hierarchy, step 510, allowing the user to traverse the bookmark folder hierarchy to locate the given bookmark. The system performs a check to determine if there are additional bookmarks for the user that require processing, step 514. Where there are additional bookmarks for the user that require processing, the bookmark storage provider selects a subsequent given bookmark for processing, step 502. Where no further bookmarks await processing, the process completes, step 516.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for generating a bookmark folder hierarchy for storage and presentation of one or more bookmarks to content items, the method comprising:

retrieving one or more bookmarks associated with one or more content items, a given bookmark generated by a user of a client device, the one or more bookmarks retrieved from a network-based bookmark storage provider;

identifying one or more user generated tags appended to one or more uniform resource locators corresponding to the one or more bookmarks, wherein the one or more user generated tags comprise one or more keywords generated by one or more users that describe the one or more content items associated with the one or more bookmarks, the one or more user generated tags identified from the network-based bookmark storage provider;

generating a candidate list of folders for the one or more bookmarks based on the one or more user generated tags;

selecting one or more candidate folders from the candidate list of folders;

generating a bookmark folder hierarchy with the selected one or more candidate folders automatically through use of a clustering algorithm on the basis of the one or more user generated tags appended to the one or more uniform resource locators corresponding to the one or more bookmarks, the bookmark folder hierarchy defining a hierarchy of the folders having bookmarks therein, the clustering algorithm performing an analysis of data associated with the one or more user generated tags;

traversing through one or more bookmark folders in the bookmark folder hierarchy;

identifying the one or more bookmark folders in the bookmark folder hierarchy to which the bookmark belongs based on tag data associated with the one or more folders, tag data based on the one or more user generated tags from the bookmark storage provider; and placing the one or more bookmarks in the one or more identified folders.

2. The method of claim 1 comprising identifying a given folder from the bookmark folder hierarchy to which the one or more bookmarks belong on the basis of the one or more user generated tags associated with the one or more bookmarks.

3. The method of claim 1 wherein identifying one or more user generated tags comprises identifying one or more tags generated by the user of the client device.

4. The method of claim 1 wherein identifying one or more user generated tags comprises identifying one or more global tags generated by one or more users.

5. The method of claim 4 wherein the clustering algorithm comprises a k-means clustering algorithm.

6. The method of claim 4 wherein the clustering algorithm comprises a k-median clustering algorithm.

7. The method of claim 4 wherein the clustering algorithm comprises a two-step clustering algorithm.

8. The method of claim 4 wherein the clustering algorithm comprises a Ward's minimum variance clustering algorithm.

9. The method of claim 4 wherein the clustering algorithm comprises a single linkage clustering algorithm.

10. The method of claim 1 wherein generating a hierarchal structure comprises generating a hierarchal tree structure.

* * * * *